United States Patent
Mibu

(10) Patent No.: US 10,838,261 B2
(45) Date of Patent: Nov. 17, 2020

(54) DISPLAY DEVICES

(71) Applicant: Panasonic Liquid Crystal Display Co., Ltd., Hyogo (JP)

(72) Inventor: Takashi Mibu, Hyogo (JP)

(73) Assignee: PANASONIC LIQUID CRYSTAL DISPLAY CO., LTD., Hyogo (JP)

( * ) Notice: Subject to any disclaimer, the term of this patent is extended or adjusted under 35 U.S.C. 154(b) by 68 days.

(21) Appl. No.: 16/194,390

(22) Filed: Nov. 19, 2018

(65) Prior Publication Data

US 2020/0159056 A1 May 21, 2020

(51) Int. Cl.
| | |
|---|---|
| *G02F 1/1333* | (2006.01) |
| *G02F 1/1339* | (2006.01) |
| *G02B 5/20* | (2006.01) |
| *G02F 1/1335* | (2006.01) |
| *G02F 1/1343* | (2006.01) |

(52) U.S. Cl.
CPC ......... *G02F 1/13394* (2013.01); *G02B 5/201* (2013.01); *G02F 1/133345* (2013.01); *G02F 1/133514* (2013.01); *G02F 1/133528* (2013.01); *G02F 1/134309* (2013.01)

(58) Field of Classification Search
CPC .................................................. G02F 1/13394
See application file for complete search history.

(56) References Cited

U.S. PATENT DOCUMENTS

| | | | |
|---|---|---|---|
| 2010/0053536 A1* | 3/2010 | Sato | G02F 1/1337 349/155 |
| 2013/0155367 A1* | 6/2013 | Tomioka | G02F 1/1339 349/155 |
| 2015/0268504 A1 | 9/2015 | Kobayashi et al. | |

* cited by examiner

*Primary Examiner* — Sang V Nguyen
(74) *Attorney, Agent, or Firm* — HEA Law PLLC

(57) ABSTRACT

Examples of display devices are described herein. In an example, a display device comprises a color filter (CF) substrate having a black matrix extending in a first direction and a second direction different from the first direction, wherein, in plan view, two adjacent color filters of different colors are aligned along the first direction and two adjacent color filters of a same color are aligned along the second direction. The display device comprises a plurality of spacers arranged in the first direction, wherein the plurality of spacers comprises a first, second and third spacer arranged adjacent to each other. The spacers are arranged, such that along the first direction or the second direction, a distance between a center of the first spacer and a center of the second spacer is different from a distance between the center of the second spacer and a center of the third spacer.

12 Claims, 12 Drawing Sheets

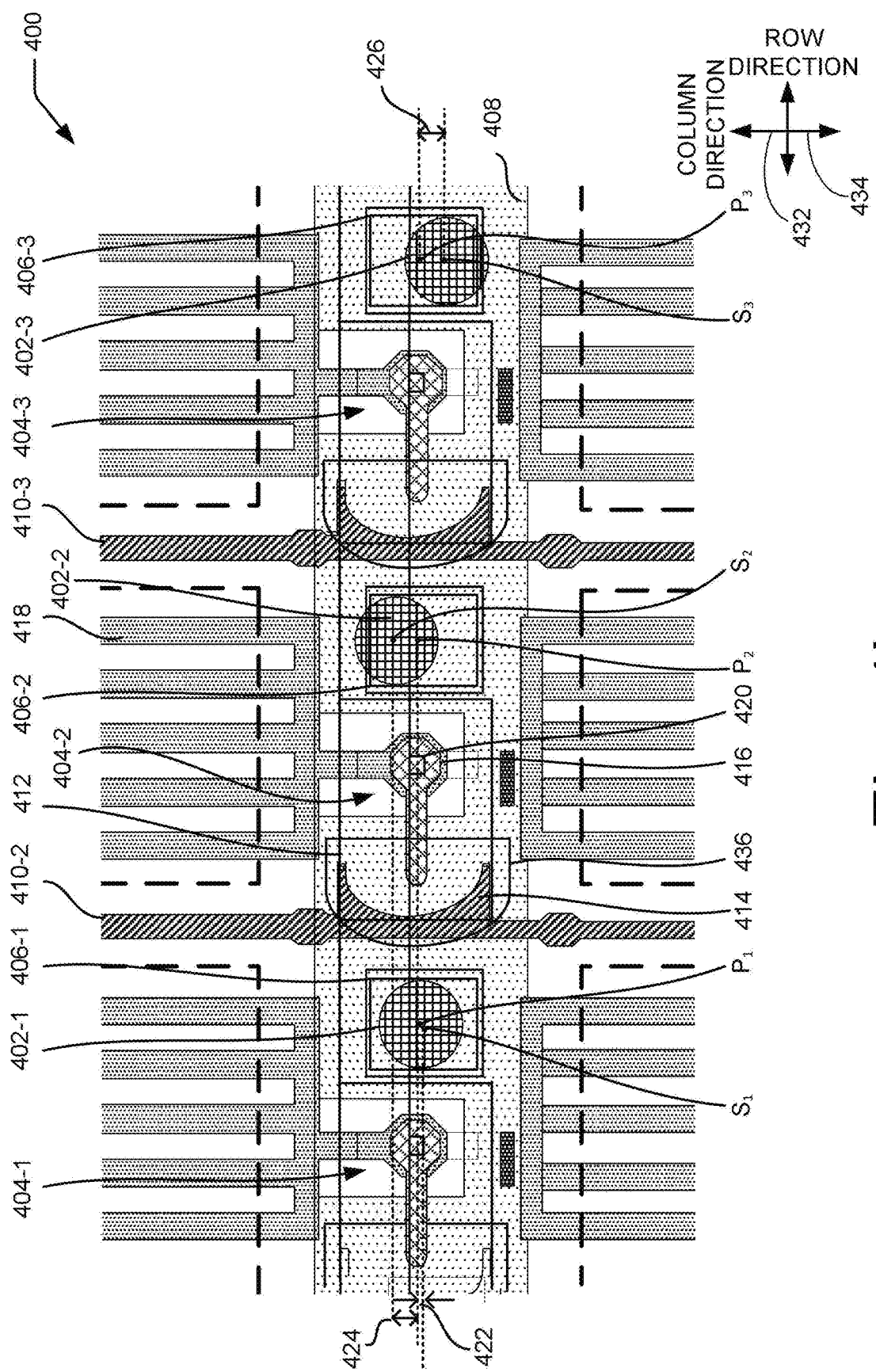

DISPLAY DEVICES

TECHNICAL FIELD

The present subject matter relates to display devices.

BACKGROUND

Liquid crystal display (LCD) devices are commonly used as display devices, owing to their low power consumption and high-quality images. LCD devices are used in a variety of electronic devices, such as televisions, laptops, monitors for desktops, tablets, smartphones, personal digital assistants, and cameras.

In an LCD device, a layer with liquid crystal molecules is sealed between a first substrate and a second substrate. Display of content by the LCD device is controlled by controlling the orientation of the long axes of the liquid crystal molecules using an electric field. The orientation of the long axes of the liquid crystal molecules controls the transmittance of light through the layer of liquid crystal molecules.

In the LCD device, a plurality of spacers is disposed in order to maintain a distance (gap) between the first substrate and the second substrate. A plurality of pedestals is formed in the first substrate, while a plurality of spacers is formed in the second substrate. The plurality of pedestals and the plurality of spacers correspond to each other, such that when the first substrate and the second substrate are aligned, a pedestal and a spacer contact with each other. The pedestal and the spacer contact with each other such that a gap, or a distance, is maintained between the first substrate and the second substrate.

SUMMARY

According to an example implementation of the present subject matter, a display device comprises a first substrate comprising a plurality of pedestals and a second substrate opposite to the first substrate. The second substrate comprises a plurality of spacers. The plurality of spacers comprises a first spacer, a second spacer and a third spacer arranged consecutively, and the plurality of pedestals comprises a first pedestal corresponding to the first spacer, a second pedestal corresponding to the second spacer and a third pedestal corresponding to the third spacer, such that, in plan view, a distance between a center of the first spacer and a center of the first pedestal is a first distance, a distance between a center of the second spacer and a center of the second pedestal is a second distance and a distance between a center of the third spacer and a center of the third pedestal is a third distance and the first distance is different from the second distance and the third distance.

In an example implementation of the display device, the first distance is smaller than the second distance and the third distance, while in another example implementation the second distance is same as the third distance.

In an example implementation, the first substrate comprises a plurality of gate lines extending in a row direction and a plurality of data lines extending in a column direction. The first distance, the second distance and the third distance are measured in one of the row direction and the column direction.

In an example implementation, the center of the second spacer is offset in a first side with respect to the center of the second pedestal, and the center of the third spacer is offset in a second side with respect to the center of the third pedestal, wherein the first side is opposite to the second side.

In a further example implementation, the first substrate comprises the plurality of gate lines extending in the row direction and the plurality of data lines extending in the column direction, wherein the first side and the second side are aligned in one of the row direction and the column direction.

In an example implementation, the center of the second spacer and the center of the third spacer are offset with respect to the center of the second pedestal and the center of the third pedestal, respectively, in a first side.

In a further example implementation, the first substrate comprises the plurality of gate lines extending in the row direction and the plurality of data lines extending in the column direction, wherein the first side is aligned in one of the row direction and the column direction.

In an example implementation, the plurality of spacers further comprises a fourth spacer located adjacent to the third spacer, and the plurality of pedestals further comprises a fourth pedestal corresponding to the fourth spacer, wherein a distance between a center of the fourth spacer and a center of a fourth pedestal is a fourth distance, and the first distance is same as the fourth distance.

In an example implementation of the display device the first substrate comprises the plurality of gate lines extending in the row direction, the plurality of data lines extending in the column direction, a plurality of pixel electrodes, a common electrode opposite to the plurality of pixel electrodes and a plurality of common metal lines extending in the column direction, formed in contact with the common electrode. The first spacer, the second spacer, the third spacer and the fourth spacer are arranged consecutively in the row direction. A common metal line from the plurality of common metal lines is located between the third spacer and the fourth spacer and closer to the third pedestal than the fourth pedestal in plan view. In the row direction, the center of the third spacer is offset in a first side with respect to the center of the third pedestal, and the first side is in a direction away from the common metal line in plan view.

In another example implementation, the first substrate comprises the plurality of gate lines extending in the row direction, the plurality of data lines extending in the column direction, a plurality of pixel electrodes, a common electrode opposite to the plurality of pixel electrodes and a plurality of common metal lines extending in the column direction, formed in contact with the common electrode. The first spacer, the second spacer, the third spacer and the fourth spacer are arranged consecutively in the row direction. A common metal line from the plurality of common metal lines is located between the third spacer and the fourth spacer and closer to the third pedestal than the fourth pedestal in plan view. A minimum distance between the common metal line and the center of the third spacer is larger than a minimum distance between the common metal line and the center of the third pedestal in plan view.

In another example implementation of the present subject matter, a display device comprising a color filter (CF) substrate having a black matrix extending in a first direction and a second direction different from the first direction, is described, wherein, in plan view, two adjacent color filters of different colors are aligned along the first direction and two adjacent color filters of a same color are aligned along the second direction. The display device comprising a plurality of spacers arranged in the first direction, wherein the plurality of spacers comprises a first spacer, a second spacer and a third spacer arranged adjacent to each other, and wherein along one of the first direction and the second direction, a distance between a center of the first spacer and a center of the second spacer is a first distance, and a distance between the center of the second spacer and a center of the third spacer is a second distance, the first distance being different from the second distance.

In an example implementation, the plurality of spacers further comprises a fourth spacer adjacent to the third spacer such that the third spacer is located between the second spacer and the fourth spacer, wherein along the one of the first direction and the second direction a distance between the center of the third spacer and a center of the fourth spacer is a third distance, and wherein the first distance is equal to the third distance.

In an example implementation of the present subject matter, the display device comprises a thin film transistor (TFT) substrate comprising a plurality of pedestals, wherein each of the plurality of pedestals corresponds to each of the plurality of spacers. The plurality of pedestals comprises a first pedestal, a second pedestal, a third pedestal and a fourth pedestal arranged consecutively such that the first pedestal, the second pedestal, the third pedestal and the fourth pedestal correspond to the first spacer, the second spacer, the third spacer and the fourth spacer, respectively, and a distance between a center of the first pedestal and a center of the second pedestal is equal to a distance between the center of the second pedestal and a center of the third pedestal and is equal to a distance between the center of the third pedestal and a center of the fourth pedestal.

In an example implementation, the TFT substrate comprises a plurality of gate lines extending in the first direction, and a plurality of data lines extending in the second direction.

In an example implementation, the center of the second spacer is offset in a first side with respect to the center of the second pedestal, and the center of the third spacer is offset in a second side with respect to the center of the third pedestal, wherein the first side is opposite to the second side.

In an example implementation, the first side and the second side are aligned in one of the first direction and the second direction.

In an example implementation, the TFT substrate comprises a plurality of pixel electrodes, a common electrode opposite to the plurality of pixel electrodes, a plurality of common metal lines extending in the second direction formed in contact with the common electrode. A common metal line from the plurality of common metal lines is located between the third spacer and the fourth spacer and closer to the third spacer than the fourth spacer in plan view, wherein the first spacer, the second spacer, the third spacer and the fourth spacer are arranged in the first direction, and the second distance is smaller than the third distance.

In an example implementation, the plurality of common metal lines are not present between the first spacer and the second spacer and between the second spacer and the third spacer.

BRIEF DESCRIPTION OF FIGURES

The following detailed description references the drawings, wherein:

FIGS. 4a-4g each schematically illustrate an enlarged plan view of a portion of a display panel, in accordance with various example implementations of the present subject matter.

DETAILED DESCRIPTION

Figure 1:
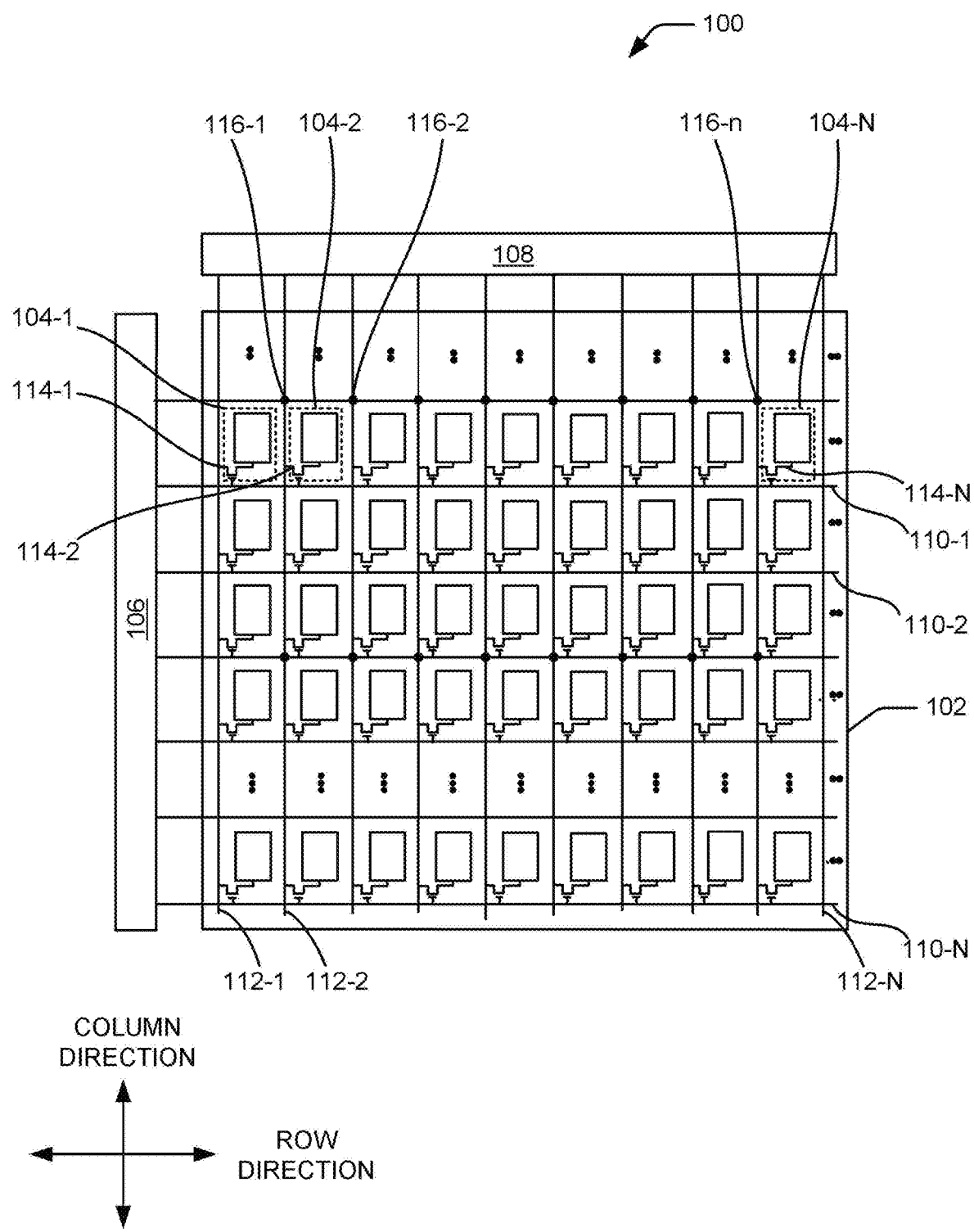
FIG. 1 schematically illustrates plan view of a display device, according to an example implementation of the present subject matter.

A display device, such as a liquid crystal display (LCD) device, comprises a liquid crystal (LC) layer sandwiched between a first substrate, for example, a thin-film-transistor (TFT) substrate and a second substrate, for example, a color filter (CF) substrate.

To maintain a gap between the first substrate and the second substrate, a plurality of pedestals is formed in the first substrate, while a plurality of spacers is formed in the second substrate. When the first substrate and the second substrate align, the plurality of pedestals and the plurality of spacers contact with each other, such that the first substrate is spaced apart from the second substrate.

In the manufacturing process, the first substrate and the second substrate are manufactured separately and then the second substrate is positioned atop the first substrate, with the plurality of spacers in the second substrate facing the plurality of pedestals in the first substrate. While positioning the second substrate on the first substrate and affixing the two substrates together, misalignments are likely. For instance, the second substrate may not completely align with the first substrate in a row direction or in a column direction. This may occur when the second substrate is shifted either in the row direction or the column direction or the both with respect to the first substrate. In either case, the misalignment may cause the plurality of pedestals and the plurality of spacers to not contact with each other properly. This results in a reduced contact area between the plurality of pedestals and the plurality of spacers that may adversely affect the pressure resistance that the spacers impart to the display device.

According to example implementations of the present subject matter, described herein is a display device comprising a first substrate having a plurality of pedestals, and a second substrate having a plurality of spacers. The second substrate is disposed on the first substrate. The plurality of spacers comprises a first spacer, a second spacer and a third spacer arranged consecutively, and the plurality of pedestals comprises a first pedestal, a second pedestal, and a third pedestal corresponding to the first spacer, the second spacer, and the third spacer, respectively, such that, in plan view, a distance between a center of the first spacer and a center of the first pedestal is a first distance, a distance between a center of the second spacer and a center of the second pedestal is a second distance and a distance between a center of the third spacer and a center of the third pedestal is a third distance and the first distance is different from the second distance and the third distance. In an example of the present subject matter, the first distance, the second distance, and the third distance may be measured either in a row direction or in a column direction.

In another example implementation of the present subject matter, a display device comprising a CF substrate is described. The CF substrate has a black matrix extending in a first direction and a second direction different from the first direction, wherein, in plan view, two adjacent color filters of different colors are aligned along the first direction and two adjacent color filters of a same color are aligned along the second direction. The CF substrate comprises a plurality of spacers arranged in the first direction, wherein the plurality of spacers comprises a first spacer, a second spacer and a third spacer arranged adjacent to each other. The spacers are arranged such that along one of the first direction and the second direction, a distance between a center of the first spacer and a center of the second spacer is a first distance, and a distance between a center of the second spacer and a center of the third spacer is a second distance, the first distance being different from the second distance.

According to the present subject matter, a pitch or a distance between two adjacent pedestals is made equal while the pitch or the distance between two adjacent spacers is made unequal. In an example, the pitch between the spacers may be such that the center of the first spacer and the center of the first pedestal may be aligned while the center of the second spacer and the third spacer may be offset with respect to the center of their corresponding pedestals. In an example, the second and third spacer may be offset in opposite sides in the row direction or/and the column direction. Making the spacers offset with respect to the corresponding pedestal, provides for compensating the reduced contact area between the plurality of pedestals and the plurality of spacers due to misalignment of the first substrate and the second substrate during the manufacturing process.

For example, in an implementation the center of the second spacer is offset with respect to the center of the second pedestal in a first side and the center of the third spacer is offset with respect to the center of the third pedestal in a second side opposite to the first side. In this case, the average contact area does not reduce so much even if the second substrate is shifted to the first side or the second side with respect to the first substrate. Since the first side and the second side are opposite to each other, when the second substrate is shifted with respect to the first substrate, while the contact area of the one of the second spacer and the third spacer with its corresponding pedestal increases while the contact area of the other of the second spacer and the third spacer with its corresponding pedestal decreases. Thus, in either situation, the average contact area remains substantially same or does not drastically change as the contact area that would have been achieved had the second substrate and the first substrate aligned completely.

Thus, in accordance with the example implementations of the display device described herein, the pressure resistance of the display device due to the spacers remains unaffected due to misalignment of the first substrate and the second substrate during the manufacturing process.

The above described display devices are further described with reference to FIGS. 1-5b. It should be noted that the description and figures merely illustrate the principles of the present subject matter along with examples described herein and, should not be construed as a limitation to the present subject matter. It is thus noted that various arrangements may be devised that, although not explicitly described or shown herein, describe the principles of the present subject matter. Moreover, all statements herein reciting principles, aspects, and examples of the present subject matter, as well as specific examples thereof, are intended to encompass equivalents thereof.

As used herein, the singular forms "a", "an" and "the" are intended to include the plural forms as well, unless the context clearly indicates otherwise. The terms "first" and "second" are for differentiating one element from the other element, and these elements should not be limited by these terms. Although the terms "first", "second", etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed herein could be termed a second element, component, region, layer or section without departing from the teachings of the present subject matter.

It should be further understood that the terms "comprises", "comprising,", "has", "having", "includes" and/or "including", when used herein, specify the presence of stated features, integers, steps, operations, elements, and/or components, but do not preclude the presence or addition of one or more other features, integers, steps, operations, elements, components, and/or groups thereof.

It will be also understood that when an element or layer is referred to as being "on", "connected to" or "coupled to" another element or layer, it can be directly on, connected or coupled to the other element or layer or intervening elements or layers may be present. Like numbers refer to like elements throughout. As used herein, the term "and/or" includes any and all combinations of one or more of the associated listed items.

Also, spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the elements in use or operation in addition to the orientation depicted in the figures.

FIG. 1 schematically illustrates plan view of a display device 100, such as a liquid crystal display (LCD) device, according to an example implementation of the present subject matter. The display device 100 includes a display panel 102 having a plurality of pixels 104-1, 104-2, . . . , 104-N arranged in a matrix arrangement. The pixels are collectively and individually referenced as 104. The display panel 102 includes a first substrate (not shown in FIG. 1), a second substrate (not shown in FIG. 1) opposite to the first substrate, and a liquid crystal layer (not shown in FIG. 1) between the first substrate and the second substrate. The second substrate is towards a viewing side of the display panel 102, and the first substrate is towards a back side of the display panel 102. The liquid crystal layer includes liquid crystal molecules.

A driving circuit (not illustrated) of the display device 100, comprising a gate line driving circuit 106 and data line driving circuit 108, drives the pixels 104 in accordance with an input signal to display an image corresponding to the input signal. The driving circuit comprises a plurality of gate lines 110-1, 110-2, . . . 110-N and a plurality of data lines 112-1, 112-2, . . . 112-n arranged such that each pixel 104 is surrounded by two adjacent gate lines 110-1, 110-2, . . . 110-N and two adjacent data lines 112-1, 112-2, . . . 112-n. The gate lines and data lines are collectively and individually referenced as 110 and 112, respectively.

A thin film transistor 114-1, 114-2, . . . 114-N, collectively and individually referenced as 114, is provided in each pixel 104. The thin film transistors 114 are formed at each intersection of the gate lines 110 with the data lines 112. The thin film transistors 114 act as a switching device to control an electric field applied to each of the pixels 104 based on the input signal. The electric field in turn controls the orientation of the liquid crystal molecules in the liquid crystal layer to control transmission of light through the liquid crystal layer to display images on the display panel 102 based on the input signal.

The gate lines 110, the data lines 112 and the TFTs 114 are in the first substrate of the display panel 102. The first substrate also comprises a plurality of pedestals (not shown in FIG. 1). The plurality of pedestals of the first substrate interface with a plurality of spacers 116-1, 116-2, . . . 116-N provided on the second substrate. The plurality of spacers 116-1, 116-2, . . . 116-n, collectively and individually referenced as spacers 116, are formed in the vicinity of the TFTs 114. The pedestals and the spacers 116 contact such that they maintain a distance between the first substrate and the second substrate in the display panel 102.

According to example implementations of the present subject matter, as will be elaborated later, a pitch or a distance between two adjacent spacers 116 is made unequal to compensate a decrease in contact area between the pedestals and the spacers 116 due to misalignment of the first substrate and the second substrate during the manufacturing process.

Figure 2:
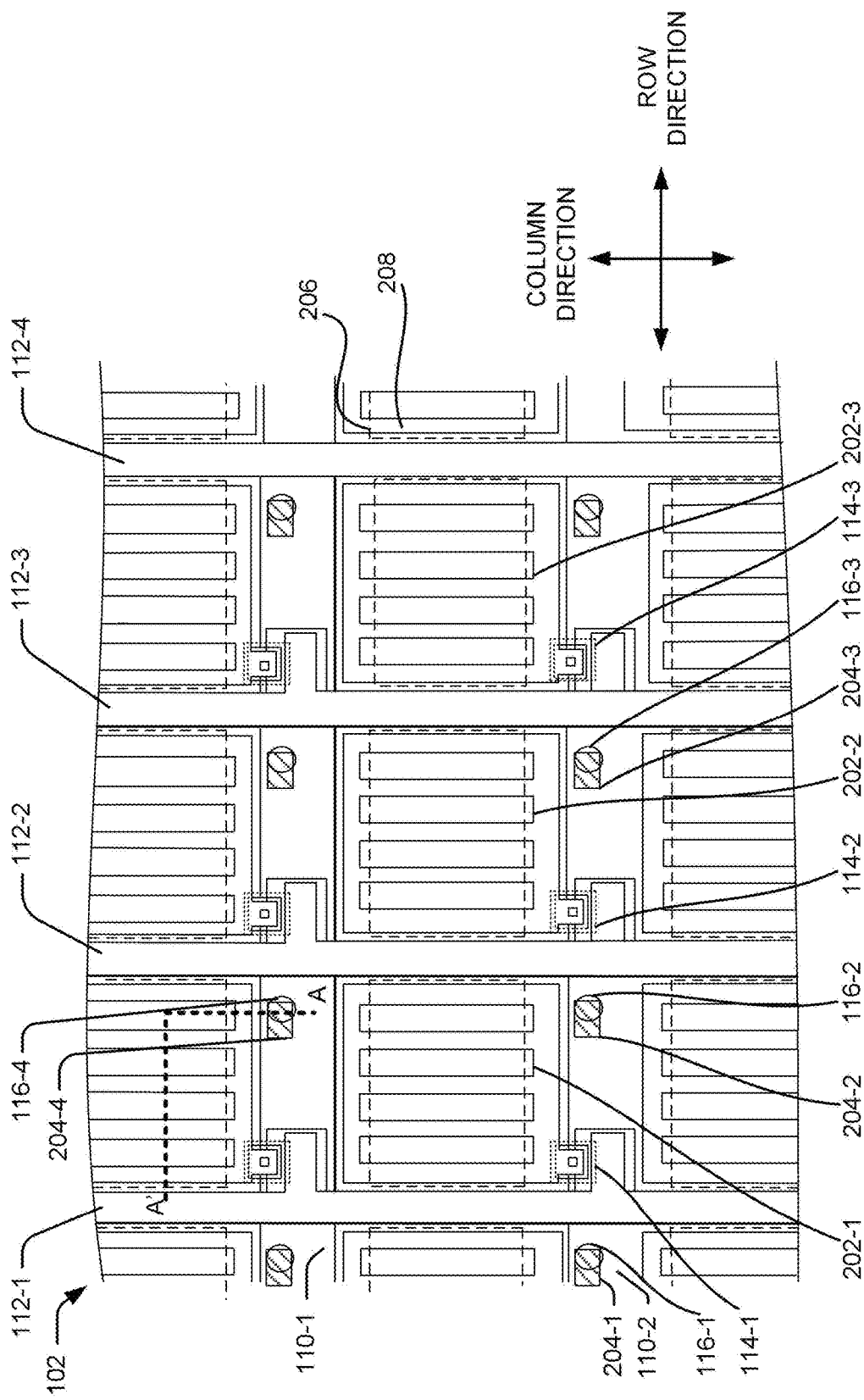
FIG. 2 schematically illustrates plan view of a portion of a display panel of the display device, according to an example implementation of the present subject matter.

FIG. 2 schematically illustrates plan view of the display panel 102, according to an example implementation of the present subject matter. As shown, the pixel 104-1 is formed in a region sectioned by two adjacent data lines 112-1 and 112-2 and two adjacent gate lines 110-1 and 110-2. Similarly, another pixel 104-2 is formed in the region sectioned by two adjacent data lines 112-2 and 112-3 and the gate lines 110-1 and 110-2. Yet another pixel 104-3 is formed between data lines 112-3 and 112-4 (not shown) and the gate lines 110-1 and 110-2. The pixels 104-1, 104-2 and 104-3 include pixel electrodes 202-1, 202-2 and 202-3 and TFTs 114-1, 114-2 and 114-3, respectively.

The spacers 116 are disposed, for example, near TFTs 114, such that an aperture of the pixels 114 is not degraded. The spacers 116, are formed in the second substrate (not shown in FIG. 2), so as to be disposed between adjacent TFTs 114 in the row direction in plan view. A plurality of pedestals 204-1, 204-2 and 204-3 are formed in the first substrate (not shown in FIG. 2). The pedestals 204-1, 204-2 and 204-3, collectively and individually referred to as pedestals 204, are formed in the region facing spacers 116. In an example, the pedestals 204 are formed so as to be disposed between TFTs 114 that are adjacent in the row direction in plan view. The pedestals 204 face the spacers 116 when the first substrate and the second substrate are affixed to each other, for example, by adhesion.

The spacers 116 may include two kinds of spacers having different heights. The spacers 116 may include main spacers contacting with a surface of the TFT substrate over its corresponding pedestal 204 in a normal state and sub-spacers which do not contact with the surface of the TFT substrate over the pedestal 204 in the normal state, but contacts with thereon when the display panel 102 is deformed. In an example, the number of sub-spacers may be larger than the number of main spacers. The provision of sub-spacer can achieve improvement of pressure resistance and suppression of bubble generation during low temperature.

In accordance with an example implementation of the present subject matter, the plurality of spacers 116 and the pedestals 204 may be disposed, such that, in plan view, a distance between a center of a first spacer 116-1 and a center of a first pedestal 204-1 is a first distance, a distance between a center of the second spacer 116-2 and a center of the second pedestal 204-2 is a second distance and a distance between a center of a third spacer 116-3 and a center of a third pedestal 204-3 is a third distance and the first distance is different from the second distance and the third distance. The center of the spacers 116 and the center of the pedestals 204 is not shown in FIG. 2. The offset of the center of the spacers 116 with respect to center of the corresponding pedestals 204 will be elaborated later.

The second substrate includes a black matrix 206 (shown with dotted lines), which covers the data lines 112, the gate lines 110, and the TFTs 114. The black matrix 206 also covers the spacers 116 and the pedestals 204. The black matrix 206 may determine an aperture region 208 of the pixels 104. The black matrix 206 and the components, such as spacers 116 and the pedestals 204 covered by the black matrix 206 are elaborated later.

Figure 3:
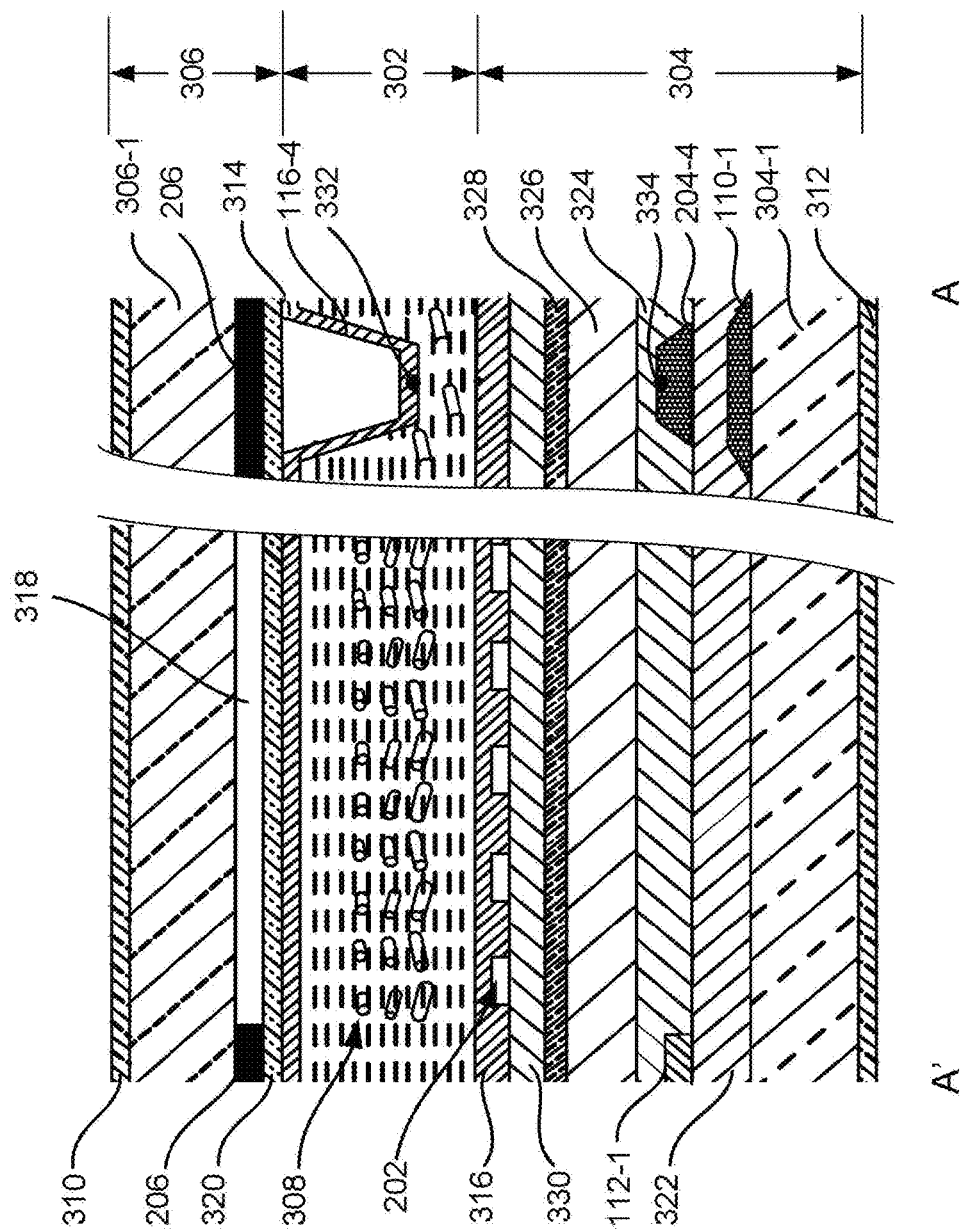
FIG. 3 schematically illustrates a cross-sectional view of the display panel along line A-A' of FIG. 2, according to an example implementation of the present subject matter.

FIG. 3 schematically illustrates a cross-sectional view of the display panel 102 taken along line A-A' shown in FIG. 2, according to another example implementation of the present subject matter. The example implementation shown in FIG. 3 depicts an aperture region of the pixel 104 and the spacer 116-4 disposed adjacent to the TFT 114 associated with the pixel 104.

FIG. 3 shows a liquid crystal layer 302 between a first substrate 304 and a second substrate 306. The first substrate 304 and the second substrate 306 both include a first substrate layer 304-1 and the second substrate layer 306-1, respectively that are made of a transparent material, such as glass or a transparent plastic. The liquid crystal layer 302 includes liquid crystal molecules 308. A first polarizer 310 is disposed on an outer surface of the second substrate layer 306-1, and a second polarizer 312 is disposed on an outer surface of the first substrate layer 304-1, as shown in FIG. 3. The first polarizer 310 and the second polarizer 312 are disposed such that their polarization axes are perpendicular to each other.

Further, a first alignment layer 314 and a second alignment layer 316 are disposed on both sides of the liquid crystal layer 302. The first alignment layer 314 and the second alignment layer 316 are for fixing an original alignment of the liquid crystal molecules 308 in the liquid crystal layer 302. The first and second alignment layers 314 and 316 may be made of a polyamide, in an example.

Further, as shown in FIG. 3, a color filter 318 is formed on the second substrate layer 306-1. The color filter 318 includes pigments of red, green, or blue color, depending on the colored light required from the pixel 104. An overcoat layer 320 is coated on the color filter 318. The overcoat layer 320 prevents pigments from releasing out to the liquid crystal layer 302.

Further, a gate insulating layer 322 is formed on an inner surface of the first substrate layer 304-1. The gate insulating layer 322 covers the gate lines 110-1. The gate insulating layer 322 may be formed of silicon nitride (SiN), silicon dioxide ($SiO_2$), or alumina. The data lines 112-1 are on the gate insulating layer 322. A protective insulating layer 324 is formed to cover the data lines 112-1. The protective insulating layer 324 may be formed of silicon nitride (SiN) or silicon dioxide ($SiO_2$). Further, an organic protective insulating layer 326 is formed on the protective insulating layer 324. The organic protective insulating layer 326 is a photosensitive resist and is made of an acrylic material.

Further, as shown in FIG. 3, a common electrode 328 is formed on the organic protective insulating layer 326. The common electrode 328 is made of a transparent material, such as indium-tin oxide, indium-zinc oxide. An upper portion insulating layer 330 is formed on the common electrode 328. The upper portion insulating layer 330 is made of silicon nitride (SiN) or silicon dioxide ($SiO_2$).

Further, as shown, the pixel electrode 202 of the pixel 104 is formed on an upper portion insulating layer 330 that is disposed on the common electrode 328. Further, the black matrix 206 is formed on an inner side of the second substrate layer 306-1. The black matrix 206 prevents mixing of colors displayed by pixels adjacent to the pixel 104-1.

It may be noted that the second substrate layer 306-1, the color filter 318, the black matrix 206, the spacer 116-4 and other components or layers formed on the second substrate layer 306-1 constitute the second substrate 306, which in an example is the CF substrate of the display panel 102 of the display device 100. Similarly, it may be noted that the first substrate layer 304-1, the gate lines, the gate insulating layer 322, the source lines, the pixel electrode 202, and other components or layers formed on the first substrate layer 304-1 constitute the first substrate 304, which in an example is the TFT substrate of the display panel 102 of the display device 100.

The first substrate 304 and the second substrate 306 are adhered to each other by a sealant with a cell gap formed therebetween. The liquid crystal layer 302 is composed of liquid crystal molecules 308 sealed in the cell gap formed between the first alignment layer 314 of the second substrate 306 and the second alignment layer 316 of the first substrate 304. For maintaining the cell gap, suppressing formation of bubbles in the liquid crystal layer 302 at low temperature and to enhance resistance to compressive deformation due to external impact, the display panel 102 further includes the spacers 116.

As mentioned previously, the spacers 116 include main spacers that contacting with a surface of the first substrate 304 over its corresponding pedestal 204 in a normal state and sub-spacers which do not contact with thereon in the normal state, but contacts when the display panel 102 is deformed. In the example implementation depicted in FIG. 3, the spacer 116-4 is a sub-spacer. The spacer 116-4 is formed on the second substrate 306 so as to not overlap with the pixel electrodes 202 in plan view. In an example, the spacer 116-4, alike all other spacers 116 is shaped as a pillar that is tapered toward the first substrate 304. Also, an example, the spacer 116-4, alike all other spacers 116, is formed of a resin material.

As shown in FIG. 3, the spacer 116-4 is disposed between the first alignment layer 314 and the second alignment layer 316. The pedestal 204-4 corresponding to the spacer 116-4 is formed between the gate insulating layer 322 and the protective insulating layer 324. In an example, the pedestal 204-4 may be a protruding structure and may have a cross-section shaped as a square, rectangle, circle or any other similar shape. In an example, the pedestal 204-4, alike all other pedestals 204, is formed of metal, same as the data line 112-1. Thus, the pedestal 204-4 and the data line 112-1 are formed in the same layer.

In accordance with an example implementation of the present subject matter, a center 332 of the spacer 116-4 may be aligned with a center 334 of the pedestal 204-4 or may be offset in a first side or a second side with respect to the center 334 of the pedestal 204-4, as will be elaborated subsequently.

Figure 4A:
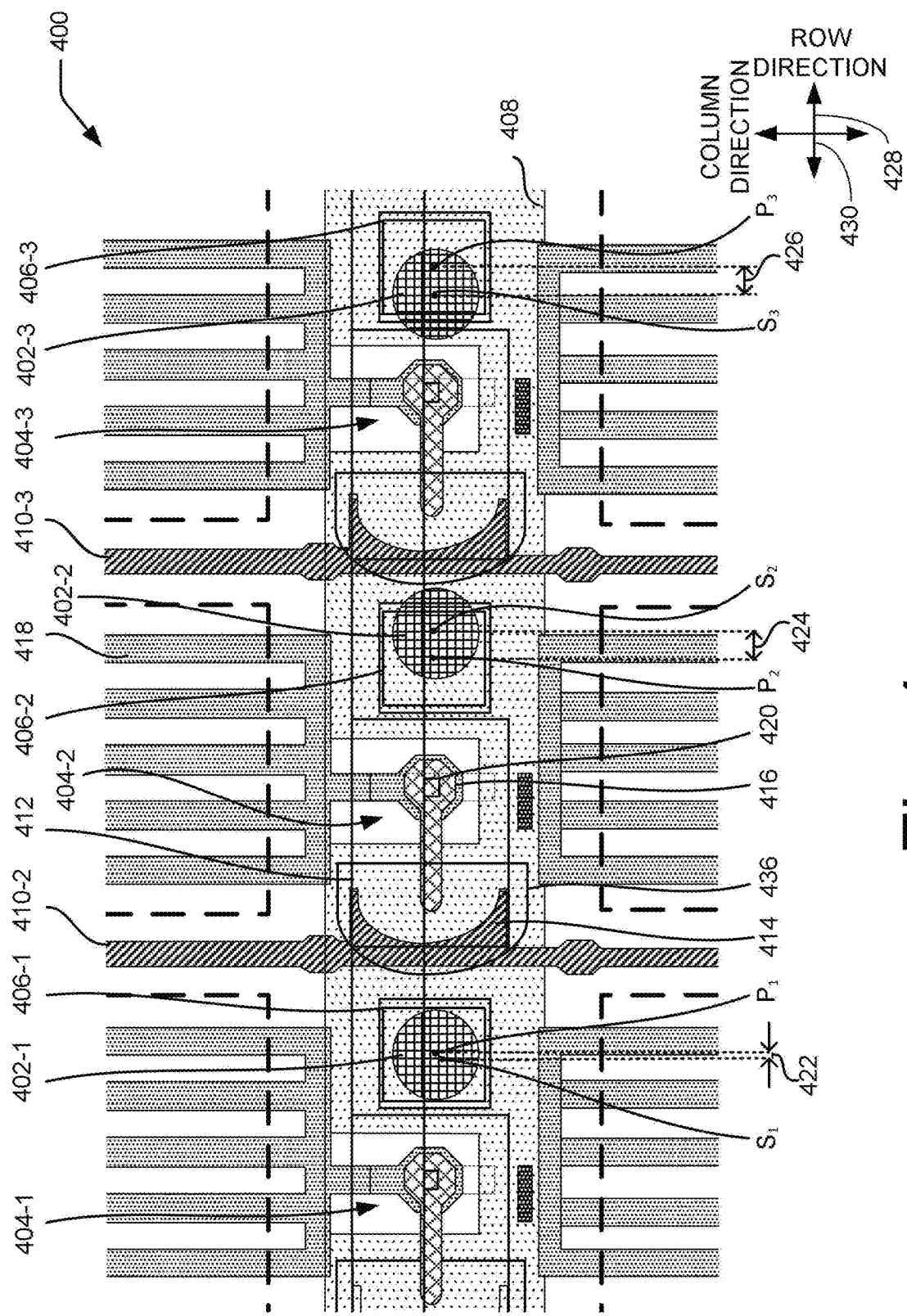

Reference is now made to FIGS. 4a and 4b that schematically illustrate an enlarged plan view of a display panel 400, according to an example implementation of the present subject matter.

In the display panel 400, a plurality of spacers 402 are formed in a second substrate (not shown in FIG. 4), so as to be disposed between TFTs 404 that are arranged consecutively in a row direction in plan view. Similarly, a plurality of pedestals 406 corresponding to each of the plurality of spacers 402 is formed in a first substrate (not shown in FIG. 2), in a region of the first substrate facing the second substrate.

The display panel 400 further comprises a plurality of gate lines extending in a row direction and a plurality of data lines extending in a column direction. Depicted in FIG. 4 is a gate line 408 and a first data line 410-1 (not shown), a second data line 410-2 and a third data line 410-3. A first TFT 404-1, a second TFT 404-2 and a third TFT 404-3 are formed near an intersection part of the first data line 410-1, the second data line 410-2 and the third data line 410-3, respectively, with the gate line 408.

Each of the first TFT 404-1, the second TFT 404-2 and the third TFT 404-3 are similar in structure and thus, the structure of one of them, for example, the second TFT 404-2 alone may be explained. The second TFT 404-2 includes a semiconductor layer 436 and a drain electrode 414 and source electrode 416 formed on semiconductor layer 436. The drain electrode 414 is electrically connected to data line 410-2. The source electrode 416 is electrically connected to a pixel electrode 418 through a contact hole 420.

The plurality of spacers 402 comprises a first spacer 402-1, a second spacer 402-2, and a third spacer 402-3 while the plurality of pedestals 406 comprises a first pedestal 406-1, a second pedestal 406-2 and a third pedestal 406-3 corresponding to the first spacer 402-1, the second spacer 402-2, and the third spacer 402-3, respectively. Thus, the first pedestal 406-1 is disposed between the first TFT 404-1 and the second TFT 404-2. The second pedestal 406-2 is also disposed between the second TFT 404-2 and the third TFT 404-3. A center of the first spacer 402-1, the second spacer 402-2, and the third spacer 402-3 is shown as S1, S2 and S3, respectively while center of the first pedestal 406-1, the second pedestal 406-2 and the third pedestal 406-3 is shown as P1, P2 and P3, respectively.

As shown, in plan view, a distance between the center S1 of the first spacer 402-1 and the center P1 of the first pedestal 406-1 is a first distance 422. Likewise, a distance between the center S2 of the second spacer 402-2 and the center P2 of the second pedestal 406-2 is a second distance 424 and a distance between the center S3 of the third spacer 402-3 and the center P3 of the third pedestal 406-3 is a third distance 426, wherein the first distance 422 is different from the second distance 424 and the third distance 426.

In an example, the first distance 422, the second distance 424, and the third distance 426 are measured in the row direction, as shown in FIG. 4a. In another example, the first distance 422, the second distance 424, and the third distance 426 are measured in the column direction, as shown in FIG. 4b.

In an example implementation, the first distance 422 is smaller than the second distance 424 and the third distance 426. In such an example implementation, the center S1 of the first spacer 402-1 may be aligned with respect to the center P1 of the first pedestal 406-1 while the center S2 of the second spacer 402-2 and the center S3 of the third spacer 402-3 may be offset with respect to the centers P2 and P3 of their respective pedestals 406-2 and 406-3. The offset of a center of a spacer with respect to a center of a pedestal may be understood as non-alignment of the two centers such that, in plan view, the two centers are spaced apart by a distance.

In an example, the center S1 of the first spacer 402-1 may be aligned with respect to the center P1 of the first pedestal 406-1. In such a case, the first distance 422 may be substantially zero. The center S2 of the second spacer 402-2 may be offset with respect to the centers P2 of the pedestal 406-2 and the offset may be by the second distance 424 in an example. Similarly, the center S3 of the third spacer 402-3 may be offset with respect to the center P3 of the third pedestal 406-3. In an example, the offset between the center P3 and center S3 may be the third distance 426.

In an example, the second distance 424 is same as the third distance 426. In other words, the offset of center S2 of the second spacer 402-2 and the center S3 of the third spacer 402-3 with respect to the centers P2 and P3 of their respective pedestals 406-2 and 406-3 may be the same. This offset may be in a same side or in opposite sides. For example, the center S2 of the second spacer 402-2 is offset in a first side with respect to the center P2 of the second pedestal 406-2, and the center S3 of the third spacer 402-3 is offset in a second side with respect to the center P3 of the third pedestal 406-3, and wherein the first side is opposite to the second side.

The first side and the second side may be aligned in either the row direction and the column direction. As apparent, FIG. 4a shows the first side and the second side to be aligned in the row direction. In FIG. 4a, the first side is a positive side 428 in the row direction while the second side is a negative side 430 in the row direction. The positive side 428 and the negative side 430 of the row direction, in an example, is a right side and a left side, respectively. The FIG. 4b shows the first side and the second side to be aligned in the column direction. In FIG. 4b, the first side is a positive side 432 in the column direction while the second side is a negative side 434 in the column direction. in an example, the positive side 432 and the negative side 434 in the column direction may refer to an upward side and a downward side, respectively.

It may be noted that FIG. 4a shows an ideal positioning of the first substrate and the second substrate, with the second substrate positioned on top of the first substrate. In the ideal positioning of the second substrate on the first substrate, the two substrates are substantially aligned or, in other words, have significantly low misalignments in the row direction. Similarly, FIG. 4b shows the ideal positioning of the second substrate on the first substrate with almost complete alignment of the two substrates in the column direction.

Example implementations wherein the center S2 and S3 of the second spacer and the third spacer 402-2 and 402-3 are offset with respect to the centers P2 and P3 of their respective pedestals 406-2 and 406-3 in the same side are also possible. Accordingly, the offset of the centers S2 and S3 of the second and the third spacers 402-2 and 402-3 with respect to the centers P2 and P3 of the second and the third pedestals 406-2 and 406-3 may be in the first side, in one example, and in the second side, in another example. Also, as mentioned above, the first side and the second side may be aligned in the row direction or the column direction.

Figure 4C:
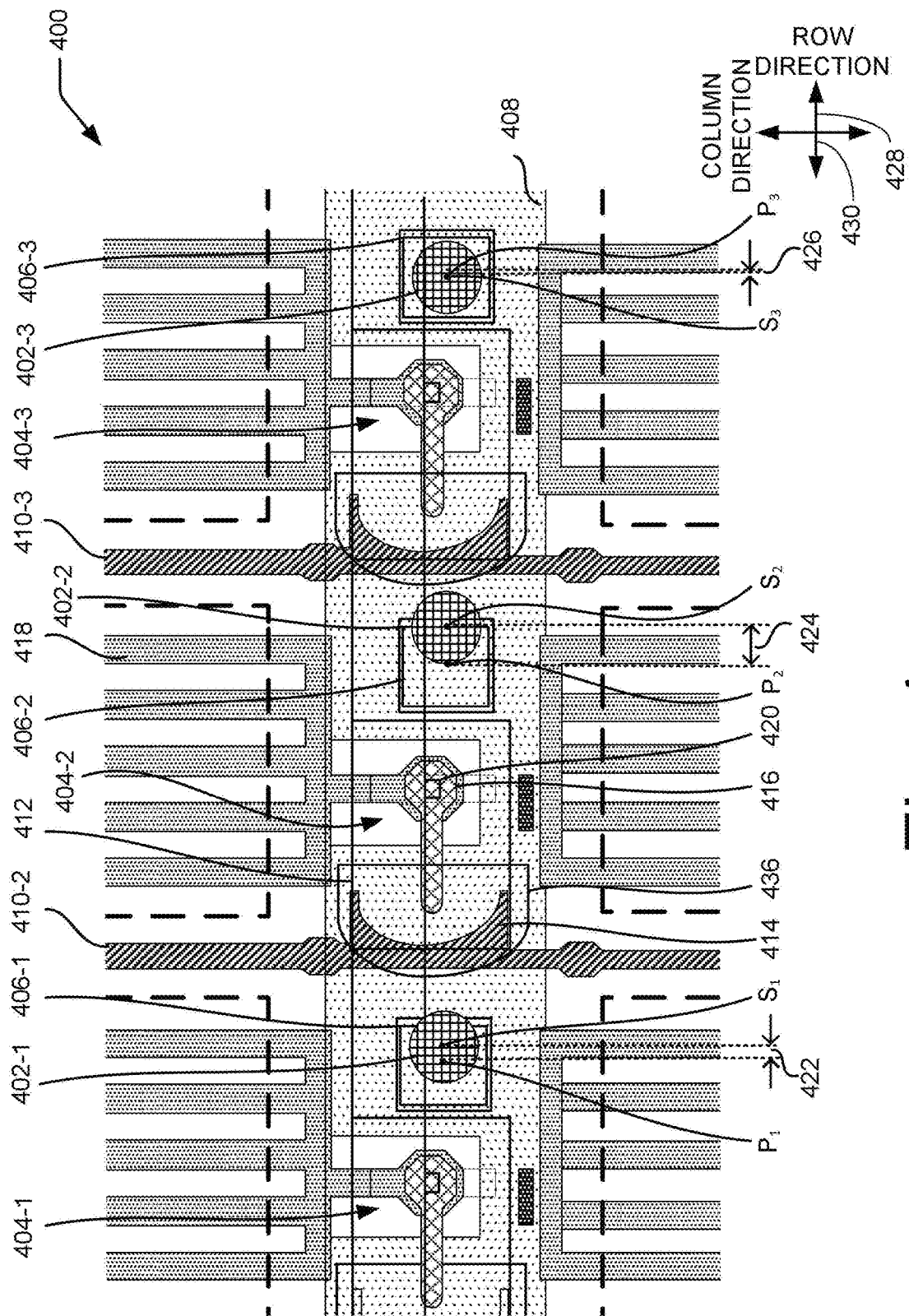
Figure 4D:
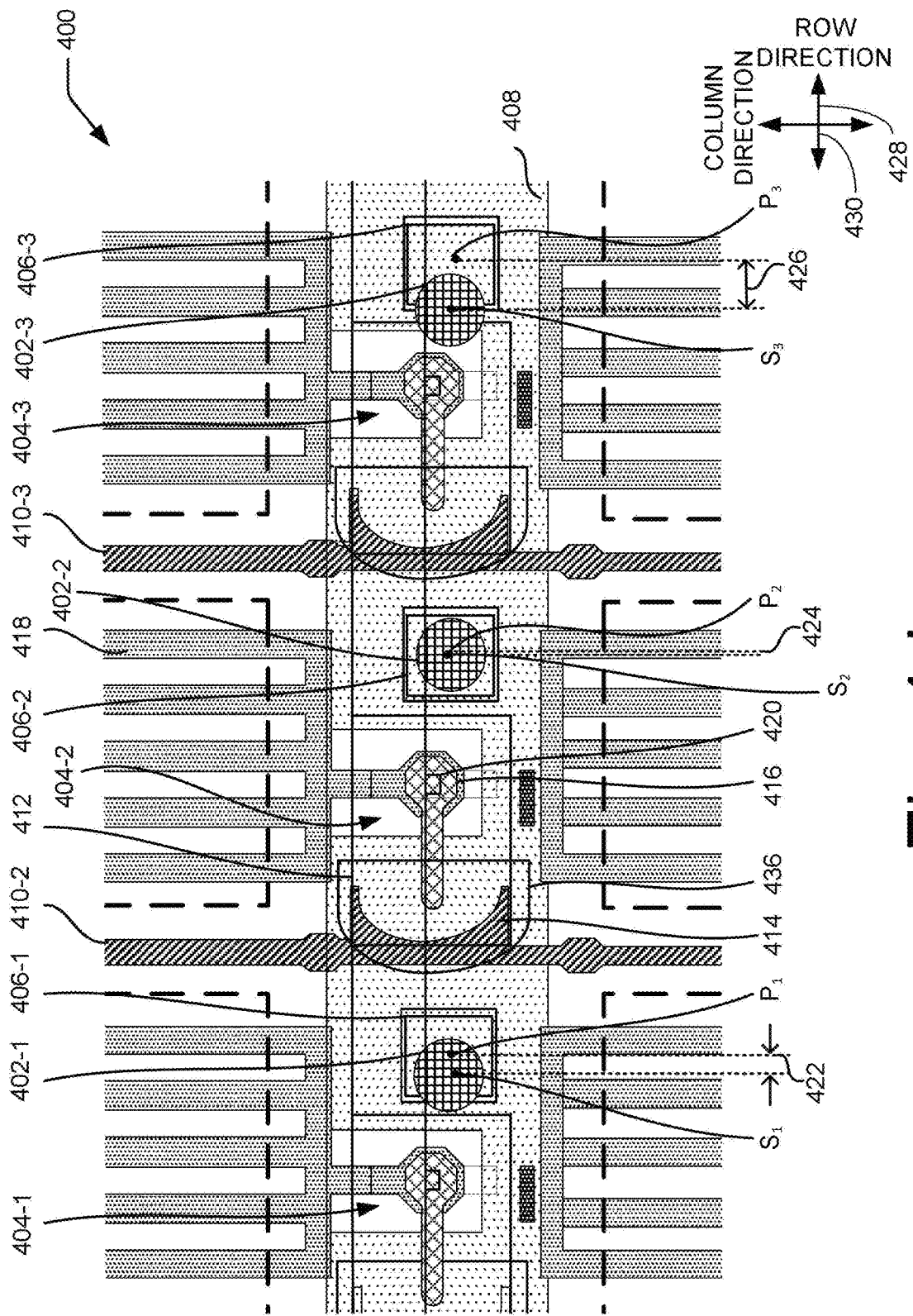

Shown in FIG. 4c and FIG. 4d is a spatial relationship of the centers S1, S2 and S3 of the first, second and the third spacers 402-1, 402-2 and 402-3 with respect to the centers P1, P2 and P3 of the first, second and the third pedestals 406-1, 406-2 and 406-3 in a non-ideal positioning of the first substrate and the second substrate. FIG. 4c depicts the spatial relationship when the second substrate is positioned on top of the first substrate such that the second substrate is offset in the first side, in the row direction. Similarly, shown in FIG. 4d is the spatial relationship when the second substrate is offset in the second side in the row direction. The first side is as explained in context of FIG. 4a and depicted as the positive side 428 in FIG. 4c. In contrast to the first side, the second side, is the negative side 430 as shown in FIG. 4d.

Referring to FIG. 4c, the second substrate is shown to be shifted in the positive side 428 of the row direction in comparison to the position of the second substrate over the first substrate that is shown in FIG. 4a. The second substrate may shift to the positive side 428 of the row direction, for example, when a misalignment between the first substrate and the second substrate occurs in the process of manufacturing the display panel 400. Due to the shift of the second substrate in the positive side 428 of the row direction, the centers S1, S2 and S3 of the first, second and the third spacers 402-1, 402-2 and 402-3 get shifted in the positive side 428 of the row direction.

Accordingly, the center S1 of the first spacer 402-1, which is aligned to the center P1 of the first pedestal 406-1 in the ideal positioning of the first substrate and the second substrate as shown in FIG. 4a, shifts in the positive side 428 of the row direction in FIG. 4c. Thus, the first distance 422 between the center S1 of the first spacer 402-1 and the center P1 of the first pedestal 406-1 increases. In a similar manner, the second distance 424 between the center S2 of the second spacer 402-2 and the center P2 of the second pedestal 406-2 also increases. However, the third distance 426 between the center S3 of the third spacer 402-3 and the center P3 of the third pedestal 406-3 decreases as the center S3 of the third spacer 402-3 gets aligned with the center P3 of the third pedestal 406-3. The alignment of the center S3 of the third spacer 402-3 with the center P3 of the third pedestal 406-3 allows to maintain some contact area between the spacers 402 and pedestals 406 even in non-ideal positioning of the first substrate and the second substrate.

Referring to FIG. 4d, the second substrate is shown to be shifted in the negative side 430 of the row direction in contrast to the position of the second substrate over the first substrate that is shown in FIG. 4a. As the second substrate moves in the negative side 430 of the row direction, the centers S1, S2 and S3 of the first, second and the third spacers 402-1, 402-2 and 402-3 also move in the negative side 430 of the row direction. This results in the first distance 422 between the center S1 of the first spacer 402-1 and the center P1 of the first pedestal 406-1 to increase. Also, the third distance 426 between the center S3 of the third spacer 402-3 and the center P3 of the third pedestal 406-3 increases. However, the center S2 of the second spacer 402-2 which was offset with respect to the center P2 of the second pedestal 406-2 in FIG. 4a, gets aligned therewith due to the movement of the second substrate in the negative side 430 and the second distance 424 minimizes. Thus, even in non-ideal positioning of the first substrate and the second substrate, when the second substrate is shifted in the negative side 430 of the row direction some contact area between the spacers 402 and pedestals 406 is maintained.

Figure 4E:
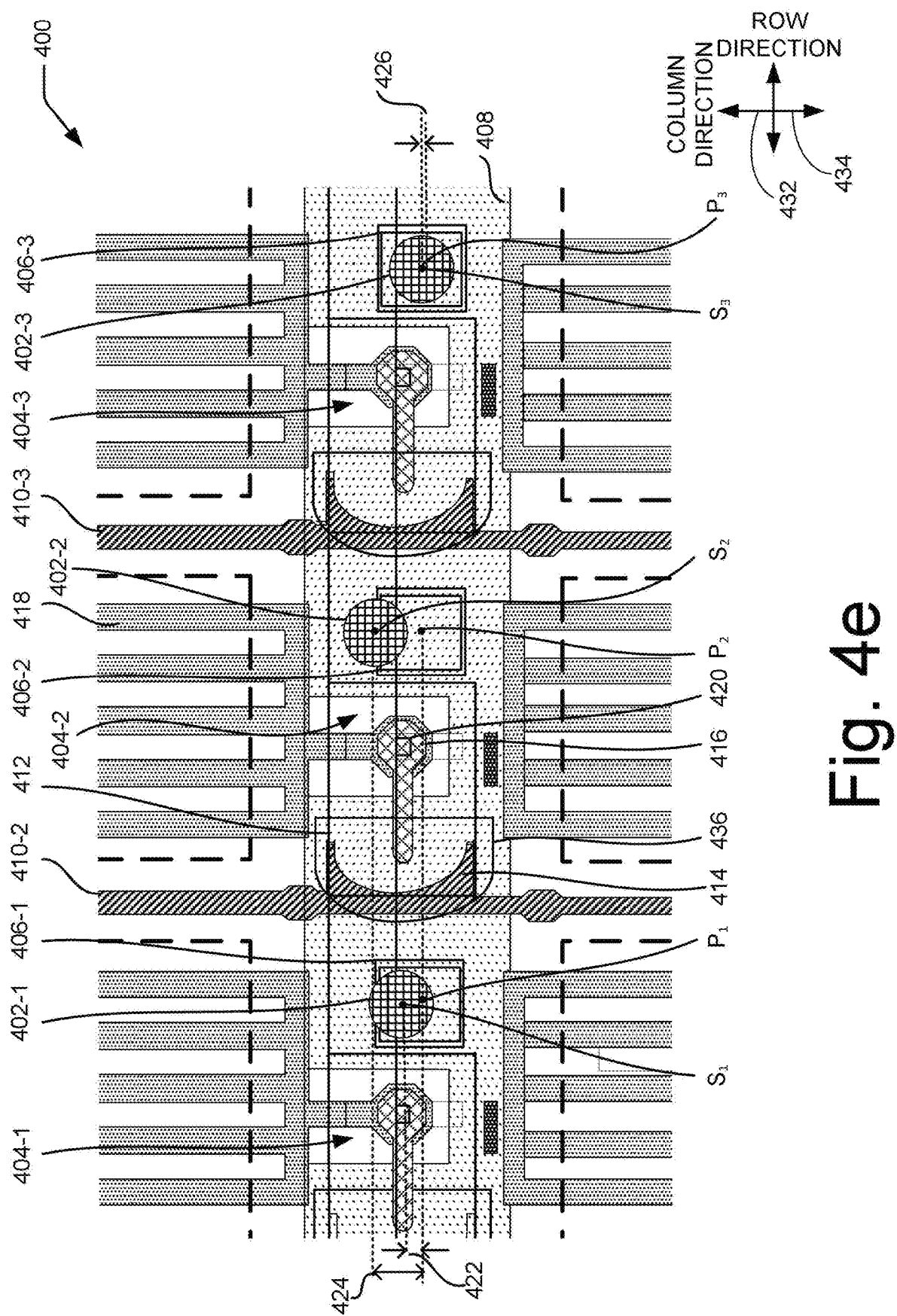
Figure 4F:
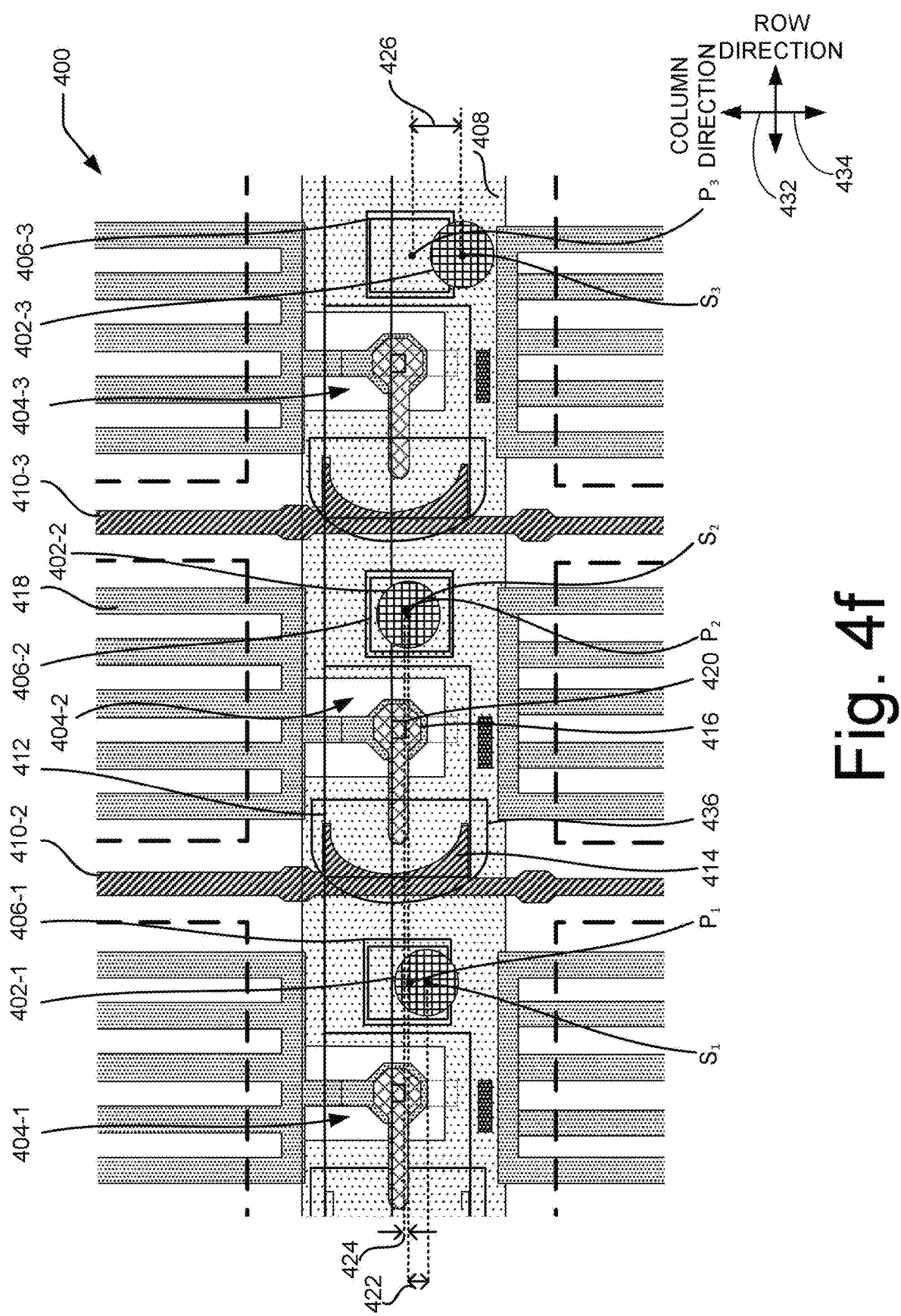

Shown in FIGS. 4e and 4f is a spatial relationship of the centers S1, S2 and S3 of the first, second and the third spacers 402-1, 402-2 and 402-3 with respect to the centers P1, P2 and P3 of the first, second and the third pedestals 406-1, 406-2 and 406-3 in a non-ideal positioning of the first substrate and the second substrate in a column direction. FIGS. 4e and 4f depict the spatial relationship when the second substrate is positioned on top of the first substrate such that the second substrate is offset in the first side in the column direction and the second side in the column direction, respectively. The first side and the second side in the column direction, is the positive side 432 and the negative side 434, respectively, in the column direction. As mentioned above, the positive side 432 and the negative side 434 in the column direction may be referred to the upward side and the downward side, respectively.

In FIG. 4e the second substrate is shown to be shifted in the positive side 432 of the column direction in comparison to the position of the second substrate over the first substrate that is shown in FIG. 4b, while in FIG. 4f, the second substrate is shown to be shifted in the negative side 434 in the column direction in contrast to the position of the second substrate over the first substrate that is shown in FIG. 4b. Thus, FIGS. 4e and 4f show non-ideal positioning of the first substrate and the second substrate, when the second substrate is shifted in the positive side 432 of the column direction and in the negative side 434 of the column direction, respectively.

As shown in FIGS. 4e and 4f, due to the shift of the second substrate in the positive side 432 and in the negative side 434, respectively, the centers S1, S2 and S3 of the first, second and the third spacers 402-1, 402-2 and 402-3 get shifted in the positive side 432 and in the negative side 434 of the column direction, respectively. The shift of the second substrate in the positive side 432 shown in FIG. 4e causes the first distance 422 between the center S1 of the first spacer 402-1 and the center P1 of the first pedestal 406-1 and the second distance 424 between the center S2 of the second spacer 402-2 and the center P2 of the second pedestal 406-2 to increase. However, as the second substrate shifts in the positive side 432, the third spacer 402-3 moves towards the third pedestal 406-3. Thus, the third distance 426 between the center S3 of the third spacer 402-3 and the center P3 of the third pedestal 406-3 decreases.

Likewise, in FIG. 4f, the shift of the second substrate in the negative side 434 causes the first distance 422 between the center S1 of the first spacer 402-1 and the center P1 of the first pedestal 406-1 and the third distance 426 center S3 of the third spacer 402-3 and center P3 of the third pedestal 406-3, respectively, to increase. However, the shift also causes the center S2 of the second spacer 402-2 and the center P2 of the second pedestal 406-2, which were spaced apart in the position of the second substrate with respect to the first substrate shown in FIG. 4b, to get aligned thereby reducing the second distance 424 between the center S2 of the second spacer 402-2 and the center P2 of the second pedestal 406-2.

Thus, the implementations depicted in FIGS. 4e and 4f show that even in non-ideal positioning of the first substrate and the second substrate, when the second substrate is shifted either in the positive side 432 or in the negative side 434 of the column direction, for instance, due to errors in the manufacturing process of the display panel 400, some contact area between the spacers 402 and pedestals 406 is maintained.

Figure 4G:
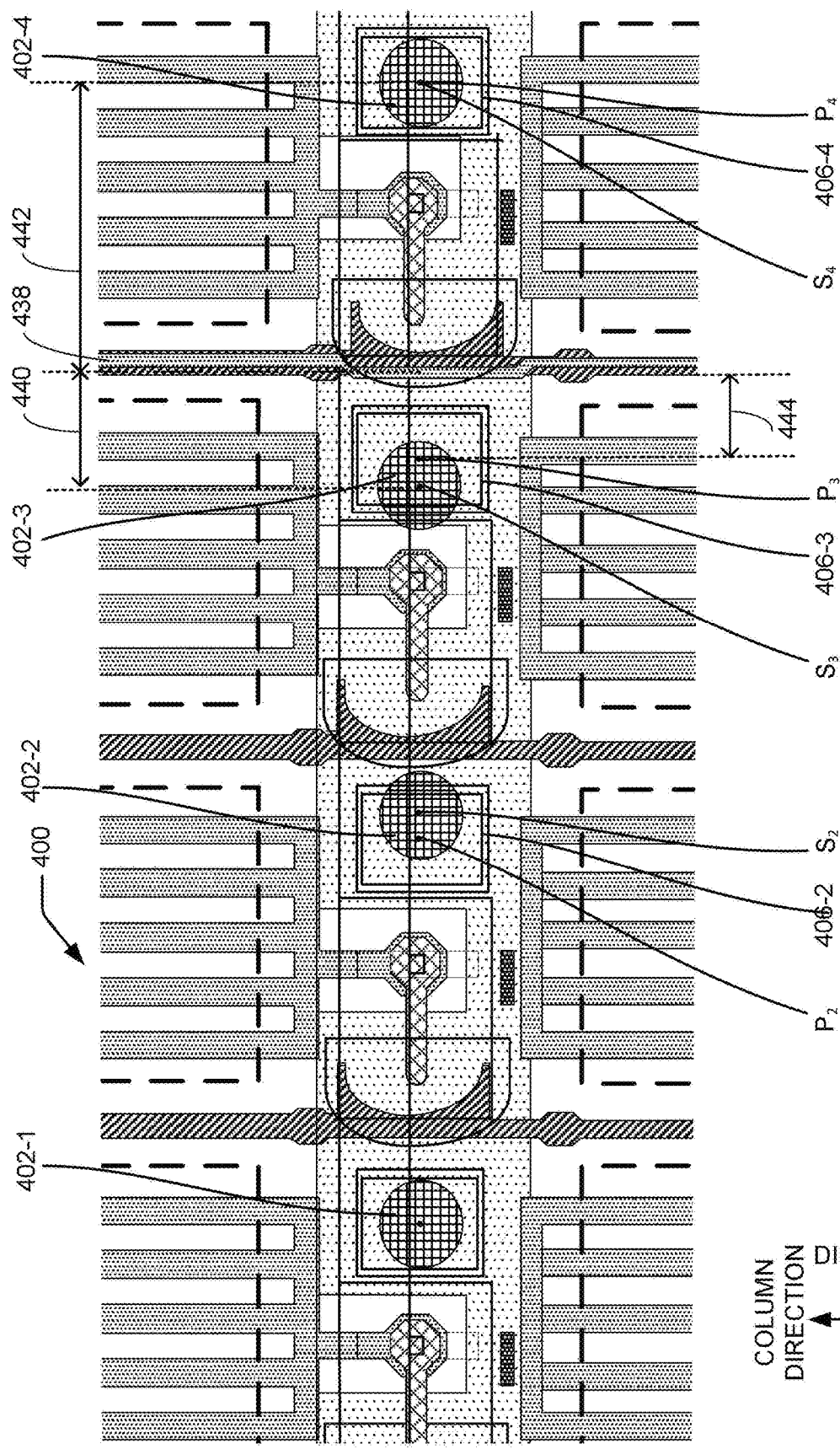

Reference is now made to FIG. 4g that schematically illustrates an enlarged plan view of the display panel 400, according to another example implementation of the present subject matter. In the example implementation shown in FIG. 4g, the plurality of spacers 402 further comprises a fourth spacer 402-4 arranged adjacent to the third spacer 402-3 and the plurality of pedestals 406 further comprises a fourth pedestal 406-4 corresponding to the fourth spacer 402-4. As shown, a center S4 of the fourth spacer 402-4 is aligned with a center P4 of the fourth pedestal 406-4. Thus, the fourth spacer 402-4 and the first spacer 402-1 may be arranged alike with respect to their corresponding pedestal 406-4 and pedestal 406-1. In this way, location relationship of the center S1 of the first spacer 402-1 corresponding to the center P1 of the first pedestal 406-1, the center S2 of the second spacer 402-2 corresponding to the center P2 of the second pedestal 406-2 and the center S3 of the third spacer 402-3 corresponding to the center P3 of the third pedestal 406-3 in this order repeats in the row direction 428, 430.

In the display panel 400 a common electrode is formed opposite to the pixel electrode 418. A plurality of common metal lines (not shown), extending in the column direction are formed in contact with the common electrode in order to make common voltage substantially uniform within the entire common electrode, because the common electrode has higher resistance than common metal lines. A common metal line 438, from the plurality of common metal lines, is located between the third spacer 402-3 and the fourth spacer 402-4, is located neither between the first spacer 402-1 and the second spacer 402-2, nor between the second spacer 402-2 and the third spacer 402-3 in plan view. It may be noted that a deterioration in the quality of image displayed by the display panel 400 may occur in case the spacers 402 touch with the common metal lines. To ensure that none of the spacers 402 touch with the common metal lines, in accordance with an example implementation, the third spacer 402-3 is offset in direction away from the common metal line 438. Making the third spacer 402-3 offset in the direction away from the common metal line 438 avoids contact between them.

Accordingly, as shown in FIG. 4g, in the row direction, the center S2 of the second spacer 402-2 is offset in the first side with respect to the center P2 of the second pedestal 406-2, and the center S3 of the third spacer 402-3 is offset in the second side with respect to the center P3 of the third pedestal 406-3, wherein the first side is in a direction towards the common metal line 438 and the second side is in a direction away from the common metal line 438. It may be recalled that, as explained in context of FIG. 4a, the first side is the positive side 428 or the right side in the row direction while the second side is the negative side 430 or the left side in the row direction. Thus, the third spacer 402-3 is offset in the second side, directed away from the common metal line 438 to ensure a possibility of contact between the third spacer 402-3 and the common metal line 438 is reduced.

In an example, the common metal line 438 is disposed such that a minimum distance 440 between the common metal line 438 and the center S3 of the third spacer 402-3 is smaller than a minimum distance 442 between the common metal line 438 and the center S4 of the fourth spacer 402-4. As will be understood, the common metal line 438 is disposed between the third spacer 402-3 and the fourth spacer 402-4. The contact between the third spacer 402-3 and the common metal line 438 is more likely than the contact between the fourth spacer 402-4 and the common metal line 438. Thus, the center S3 of the third spacer 402-3 is located such that a minimum distance 440 between the common metal line 438 and the center S3 of the third spacer 402-3 is larger than a minimum distance 444 between the common metal line 438 and the center P3 of the third pedestal 406-3 by making the third spacer 402-3 offset in a direction away from the common metal line 438.

Figure 5A:
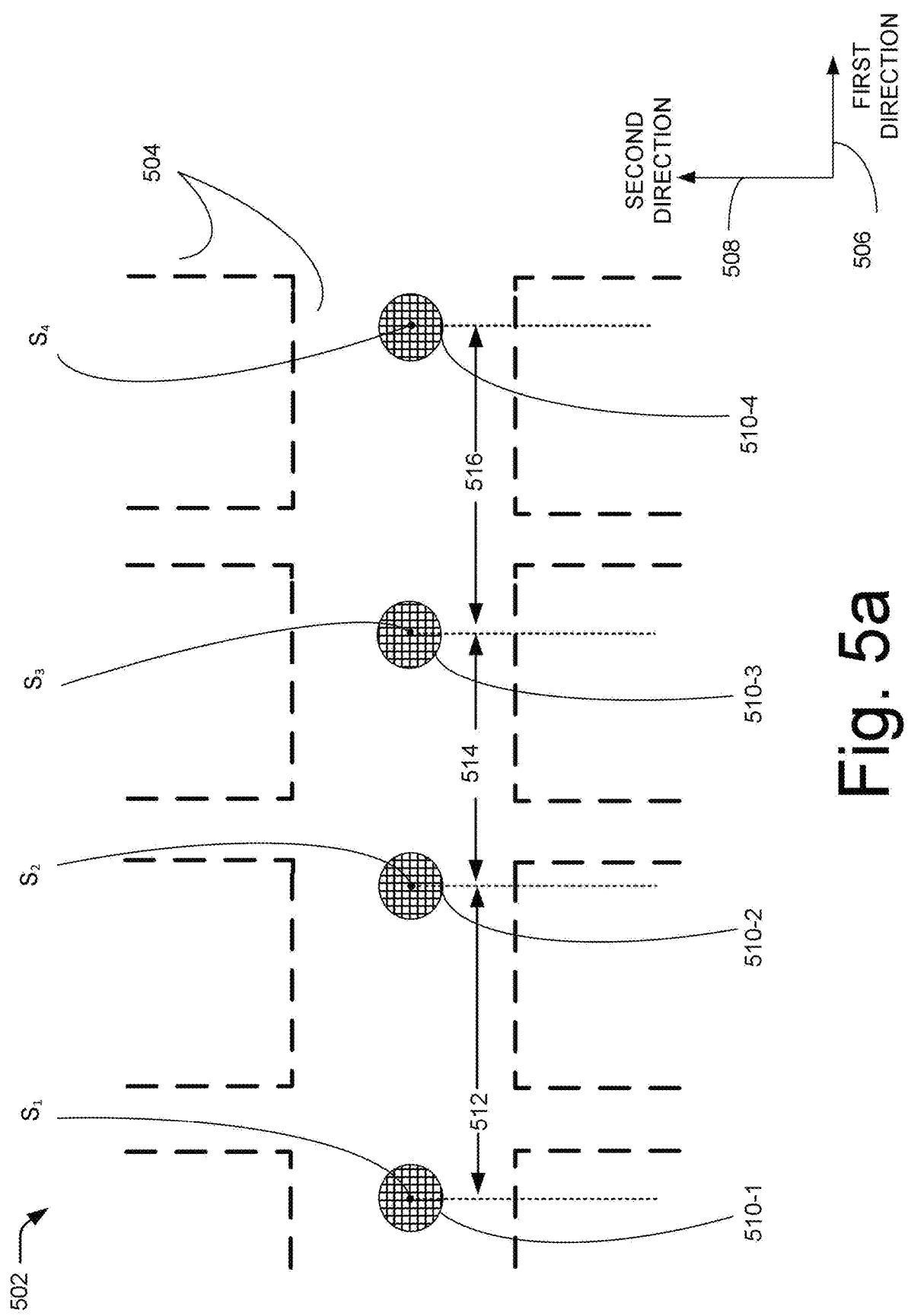
FIGS. 5a and 5b schematically illustrate plan view of color filter (CF) substrate of a display device, according to an example implementation of the present subject matter.
Figure 5B:
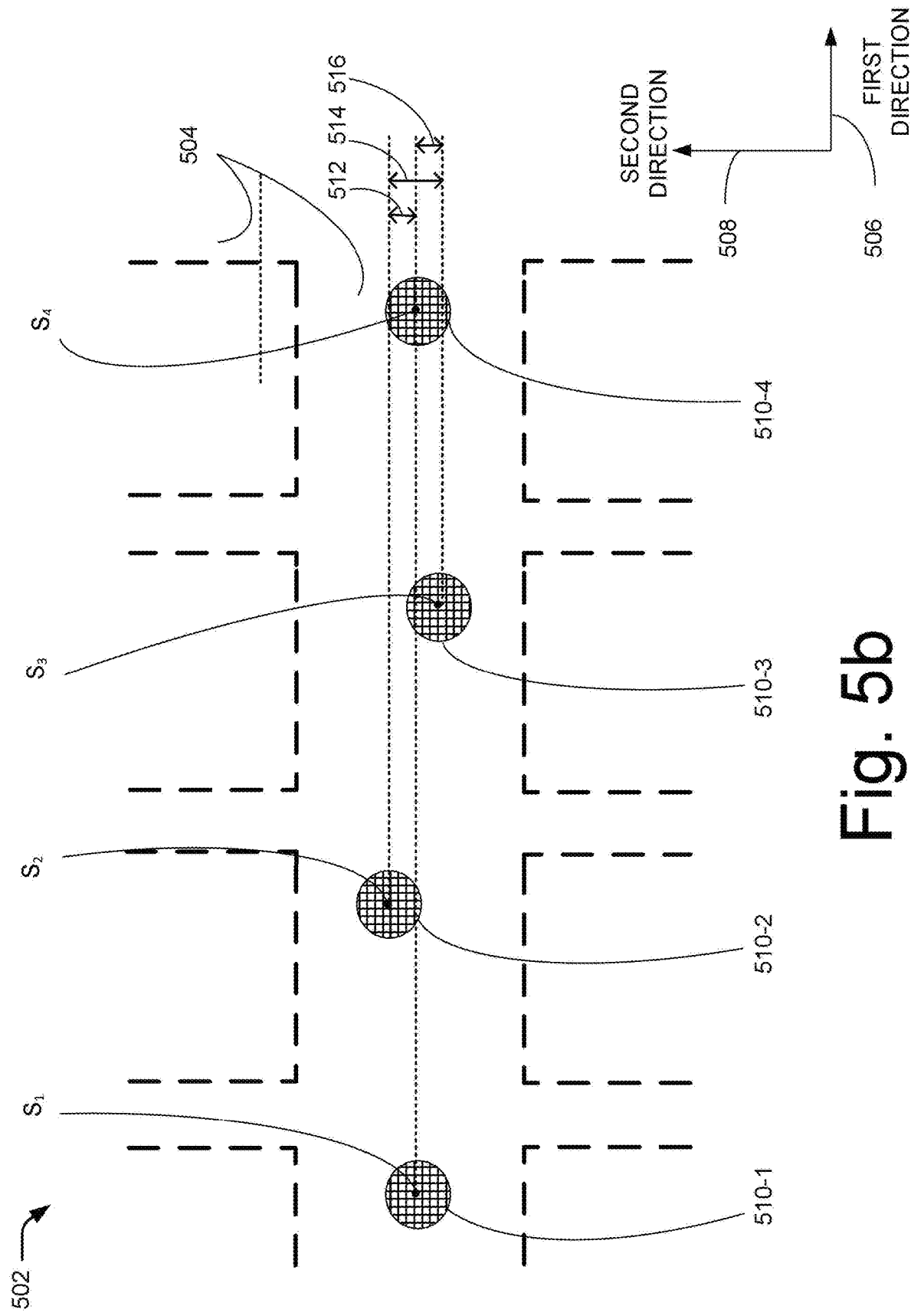

FIGS. 5a and 5b schematically illustrate plan view of a CF substrate 502 of a display device 500 according to an example implementation of the present subject matter. In an example, the CF substrate 502 may be similar to the second substrate 306 explained above.

The CF substrate 502 comprises a black matrix 504 extending in a first direction 506 and a second direction 508 different from the first direction. The first direction 506 and the second direction 508 are oriented such that, in plan view, two adjacent color filters of different colors are aligned along the first direction 506 and two adjacent color filters of a same color are aligned along the second direction 508. As will be understood, color filters of red, green and blue (R,G,B) colors may be arranged in the CF substrate 502 in form of a matrix having a plurality of rows and columns. In an example, color filters of different colors may be aligned in the row direction while color filters of a same color may be aligned in the column direction. Thus, the first direction 506 may be the row direction and the second direction 508 may be the column direction.

A plurality of spacers 510 are arranged in the first direction 506. The plurality of spacers 510 comprises a first spacer 510-1, a second spacer 510-2 and a third spacer 510-3 arranged adjacent to each other. In an example, along the first direction 506, a distance between a center S1 of the first spacer 510-1 and a center S2 of the second spacer 510-2 is a first distance 512, and a distance between a center S2 of the second spacer 510-2 and a center S3 of the third spacer 510-3 is a second distance 514.

In an example, the plurality of spacers 510 also include a fourth spacer 510-4 arranged adjacent to the third spacer 510-3. The distance between center S3 of the third spacer 510-3 and the center S4 of the fourth spacer 510-4, along the first direction 506, is a third distance 516. The third distance 516 is different from the first distance 512. However, in an example, the third distance 516 may be equal to the second distance 514. Since the first distance 512 is different from the second distance 514 and the third distance 516 in the first direction 506, the spacers 510 are arranged with unequal pitch in the first direction 506.

In a similar manner, the spacers 510 may be arranged with unequal pitch in the second direction 508. In the example implementation shown in FIG. 5b the first distance 512 between the center S1 of the first spacer 510-1 and the center S2 of the second spacer 510-2, the second distance 514 between the center S2 of the second spacer 510-2 and the center S3 of the third spacer 510-3 and the third distance 516 distance between center S3 of the third spacer 510-3 and the center S4 of the fourth spacer 510-4 is along the second direction 508. As apparent, in an example, the second direction 508 corresponds to the column direction.

In an example, the display device 500 may also comprise a TFT substrate (not shown). In an example, the TFT substrate may be similar to the first substrate 304 described above in reference to FIG. 3. The TFT substrate comprises a plurality of pedestals corresponds to each of the plurality of spacers, wherein the plurality of pedestals comprises a first pedestal, a second pedestal, a third pedestal and a fourth pedestal arranged consecutively such that, a distance between a center of the first pedestal and a center of the second pedestal is equal to a distance between the center of the second pedestal and a center of the third pedestal and is also equal to a distance between the center of the third pedestal and a center of the fourth pedestal.

The TFT substrate, in an example, comprises a plurality of gate lines extending in the first direction 506 and a plurality of data lines extending in the second direction 508 similar to the first substrate 304. As explained above, the first direction 506 may be the row direction and the second direction 508 may be the column direction. The TFT substrate may also comprise a plurality of pixel electrodes, a common electrode opposite to the plurality of pixel electrodes and a plurality of common metal lines extending in the second direction formed in contact with the common electrode, each having a configuration similar to the corresponding component of the first substrate 304. In an example, a common metal line from the plurality of common metal lines is located between the third spacer 510-3 and the fourth spacer 510-4 in plan view. As mentioned previously, this avoids contact between the common metal lines and spacers 510 adjacent thereto. In an example, the common metal line may be located between a blue color pixel and a green color pixel in plan view. For example, the common metal line may be made of Copper and may have a red hue associated with it. The common metal line is not made to be located adjacent to a red color pixel in order to avoid a red hue of light reflected by the common metal line to be allowed to transmit through the red color filter associated with the red color pixel. Thus, in an example, the third spacer 510-3 and the fourth spacer 510-4 may be located in vicinity of the blue color pixel and the green color pixel.

Thus, the plurality of pedestals may be arranged with equal pitch in the first direction 506 or the second direction 508 while the spacers 510 are arranged with unequal pitch in the first direction 506 or the second direction 508. The spacers 510 being offset with respect to the corresponding pedestals, help in maintaining the contact area between the plurality of pedestals and the plurality of spacers even in cases where misalignment may occur between the CF substrate and the TFT substrate in the process of manufacturing the display device 500. These above implementations describe misalignments that may occur in the first direction 506 or the second direction 508. The misalignment may also occur in both the first direction 506 and the second direction 508. Thus, the spacers 510 may be arranged with unequal pitch in the first direction 506 and the second direction 508.

Although implementations for display devices have been described in a language specific to structural features and/or methods, it is to be understood that the appended claims are not necessarily limited to the specific features or methods described. Rather, the specific features and methods are disclosed as example implementations for the display devices.

I claim:

1. A display device comprising:
a first substrate comprising a plurality of pedestals; and
a second substrate opposite to the first substrate, the second substrate comprising a plurality of spacers, wherein
the plurality of spacers comprises a first spacer, a second spacer and a third spacer arranged consecutively, and the plurality of pedestals comprises a first pedestal corresponding to the first spacer, a second pedestal corresponding to the second spacer and a third pedestal corresponding to the third spacer, such that, in plan view, a distance between a center of the first spacer and a center of the first pedestal is a first distance, a distance between a center of the second spacer and a center of the second pedestal is a second distance and a distance between a center of the third spacer and a center of the third pedestal is a third distance, wherein
the first distance is different from the second distance and the third distance;
wherein the first substrate comprises:
a plurality of gate lines extending in a row direction;
a plurality of data lines extending in a column direction,
a plurality of pixel electrodes;
a common electrode opposite to the plurality of pixel electrodes;
a plurality of common metal lines extending in the column direction, formed in contact with the common electrode, wherein the first spacer, the second spacer, and the third spacer are arranged consecutively in the row direction, a common metal line from the plurality of common metal lines is located between the second spacer and the third spacer and closer to the third pedestal than the second pedestal in plan view, wherein in the row direction, the center of the third spacer is offset in a first side with respect to the center of the third pedestal, and the first side is in a direction away from the common metal line in plan view.

2. The display device as claimed in claim 1, wherein the first distance is smaller than the second distance and the third distance.

3. The display device as claimed in claim 1, wherein the second distance is same as the third distance.

4. The display device as claimed in claim 1, wherein the first distance, the second distance, and the third distance are measured in one of the row direction and the column direction.

5. The display device as claimed in claim 1, wherein the center of the second spacer is offset in a first side with respect to the center of the second pedestal, and the center of the third spacer is offset in a second side with respect to the center of the third pedestal, and wherein the first side is opposite to the second side.

6. The display device as claimed in claim 5, wherein the first side and the second side are aligned in one of the row direction and the column direction.

7. The display device as claimed in claim 1, wherein the center of the second spacer and the center of the third spacer are offset with respect to the center of the second pedestal and the center of the third pedestal, respectively, in a first side.

8. The display device as claimed in claim 7, wherein the first side is aligned in one of the row direction and the column direction.

9. The display device as claimed in claim 1, wherein the plurality of spacers further comprises a fourth spacer located adjacent to the third spacer, and the plurality of pedestals further comprises a fourth pedestal corresponding to the fourth spacer, wherein a distance between a center of the fourth spacer and a center of the fourth pedestal is a fourth distance, and the first distance is same as the fourth distance.

10. A display device comprising:
a first substrate comprising a plurality of pedestals; and
a second substrate opposite to the first substrate, the second substrate comprising a plurality of spacers, wherein
the plurality of spacers comprises a first spacer, a second spacer and a third spacer arranged consecutively, and the plurality of pedestals comprises a first pedestal corresponding to the first spacer, a second pedestal corresponding to the second spacer and a third pedestal corresponding to the third spacer, such that, in plan view, a distance between a center of the first spacer and a center of the first pedestal is a first distance, a distance between a center of the second spacer and a center of the second pedestal is a second distance and a distance between a center of the third spacer and a center of the third pedestal is a third distance, wherein
the first distance is different from the second distance and the third distance;
wherein the plurality of spacers further comprises a fourth spacer located adjacent to the third spacer, and the plurality of pedestals further comprises a fourth pedestal corresponding to the fourth spacer, wherein a distance between a center of the fourth spacer and a center of the fourth pedestal is a fourth distance, and the first distance is same as the fourth distance;
wherein the first substrate comprises:
a plurality of gate lines extending in a row direction;
a plurality of data lines extending in a column direction,
a plurality of pixel electrodes;
a common electrode opposite to the plurality of pixel electrodes;
a plurality of common metal lines extending in the column direction, formed in contact with the common electrode, wherein
the first spacer, the second spacer, the third spacer and the fourth spacer are arranged consecutively in the row direction,
a common metal line from the plurality of common metal lines is located between the third spacer and the fourth spacer and closer to the third pedestal than the fourth pedestal in plan view, wherein
in the row direction, the center of the third spacer is offset in a first side with respect to the center of the third pedestal, and the first side is in a direction away from the common metal line in plan view.

11. A display device comprising:
a first substrate comprising a plurality of pedestals; and
a second substrate opposite to the first substrate, the second substrate comprising a plurality of spacers, wherein
the plurality of spacers comprises a first spacer, a second spacer and a third spacer arranged consecutively, and the plurality of pedestals comprises a first pedestal corresponding to the first spacer, a second pedestal corresponding to the second spacer and a third pedestal corresponding to the third spacer, such that, in plan view, a distance between a center of the first spacer and a center of the first pedestal is a first distance, a distance between a center of the second spacer and a center of the second pedestal is a second distance and a distance between a center of the third spacer and a center of the third pedestal is a third distance, wherein
the first distance is different from the second distance and the third distance;
wherein the plurality of spacers further comprises a fourth spacer located adjacent to the third spacer, and the plurality of pedestals further comprises a fourth pedestal corresponding to the fourth spacer, wherein a distance between a center of the fourth spacer and a center of the fourth pedestal is a fourth distance, and the first distance is same as the fourth distance;
wherein the first substrate comprises:
a plurality of gate lines extending in a row direction;
a plurality of data lines extending in a column direction,
a plurality of pixel electrodes;
a common electrode opposite to the plurality of pixel electrodes;
a plurality of common metal lines extending in the column direction, formed in contact with the common electrode, wherein
the first spacer, the second spacer, the third spacer and the fourth spacer are arranged consecutively in the row direction, and
a common metal line from the plurality of common metal lines is located between the third spacer and the fourth spacer and closer to the third pedestal than the fourth pedestal in plan view, wherein
a minimum distance between the common metal line and the center of the third spacer is larger than a minimum distance between the common metal line and the center of the third pedestal in plan view.

12. A display device comprising:
a first substrate comprising a plurality of pedestals; and
a second substrate opposite to the first substrate, the second substrate comprising a plurality of spacers, wherein
the plurality of spacers comprises a first spacer, a second spacer and a third spacer arranged consecutively, and the plurality of pedestals comprises a first pedestal corresponding to the first spacer, a second pedestal corresponding to the second spacer and a third pedestal corresponding to the third spacer, such that, in plan view, a distance between a center of the first spacer and a center of the first pedestal is a first distance, a distance between a center of the second spacer and a center of the second pedestal is a second distance and a distance between a center of the third spacer and a center of the third pedestal is a third distance, wherein
the first distance is different from the second distance and the third distance;
wherein the first substrate comprises:
a plurality of gate lines extending in a row direction;
a plurality of data lines extending in a column direction,
a plurality of pixel electrodes;
a common electrode opposite to the plurality of pixel electrodes;
a plurality of common metal lines extending in the column direction, formed in contact with the common electrode, wherein
the first spacer, the second spacer, and the third spacer are arranged consecutively in the row direction, and
a common metal line from the plurality of common metal lines is located between the third spacer and the second spacer and closer to the third pedestal than the second pedestal in plan view, wherein
a minimum distance between the common metal line and the center of the third spacer is larger than a minimum distance between the common metal line and the center of the third pedestal in plan view.

* * * * *